(12) United States Patent
Schuster et al.

(10) Patent No.: US 11,325,724 B2
(45) Date of Patent: May 10, 2022

(54) COUPLING MODULE FOR A PASSENGER BOARDING BRIDGE WITH SUSPENDED FLOOR

(71) Applicant: Hübner GmbH & Co. KG, Kassel (DE)

(72) Inventors: Heinz Schuster, Kassel (DE); Sebastian Schmelz, Niestetal (DE); Dirk-W. Kessler, Vellmar (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 16/853,436

(22) Filed: Apr. 20, 2020

(65) Prior Publication Data

US 2020/0339281 A1 Oct. 29, 2020

(30) Foreign Application Priority Data

Apr. 23, 2019 (EP) ..................................... 19170578

(51) Int. Cl.
*B64F 1/305* (2006.01)
(52) U.S. Cl.
CPC .................................. *B64F 1/305* (2013.01)
(58) Field of Classification Search
CPC .......... B64F 1/305; E01D 15/12; E01D 18/00
USPC .................................................. 14/69.5–72.5
See application file for complete search history.

(56) References Cited

U.S. PATENT DOCUMENTS

| 3,538,528 | A | * | 11/1970 | Jacobson | B64F 1/305 14/71.5 |
|---|---|---|---|---|---|
| 3,644,952 | A | * | 2/1972 | Hatch | B64F 1/305 14/71.5 |
| 3,836,101 | A | * | 9/1974 | Mattia | B64C 1/1415 244/137.1 |
| 4,011,615 | A | * | 3/1977 | Maxson | B63B 27/14 14/71.1 |
| 4,112,958 | A | * | 9/1978 | Anderberg | B64F 1/305 135/90 |
| 4,333,195 | A | * | 6/1982 | Lichti | B64F 1/305 138/118 |
| 4,553,720 | A | * | 11/1985 | Harder | B64F 1/3055 14/71.5 |
| 5,241,722 | A | * | 9/1993 | Rohrlick | B64D 39/00 14/71.5 |
| 5,253,381 | A | * | 10/1993 | Rawdon | B64C 1/22 14/71.5 |
| 6,122,789 | A | * | 9/2000 | Stephenson | B64F 1/3055 14/71.1 |

(Continued)

FOREIGN PATENT DOCUMENTS

CN 207670685 U 7/2018
EP 1867569 A2 12/2007

(Continued)

*Primary Examiner* — Raymond W Addie
(74) *Attorney, Agent, or Firm* — Dinsmore & Shohl LLP

(57) ABSTRACT

A coupling module for forming an interface between a cabin of an air passenger bridge and an aircraft. The coupling module has a projecting roof and a floor arrangement spanned by the projecting roof. The end face of the floor arrangement facing the cabin is fastenable to the cabin by at least one releasable fastening means, and the floor arrangement is connectable spaced apart from its end face to the cabin by at least one anchorage means.

13 Claims, 3 Drawing Sheets

(56) References Cited

U.S. PATENT DOCUMENTS

| | | | | |
|---|---|---|---|---|
| 6,993,802 | B1 * | 2/2006 | Hone | B64F 1/305 14/69.5 |
| 7,168,119 | B1 | 1/2007 | Telford et al. | |
| 7,596,826 | B2 * | 10/2009 | Anderberg | B64F 1/305 14/69.5 |
| 7,690,065 | B2 * | 4/2010 | Muller | B64F 1/305 14/71.5 |
| 8,091,166 | B2 * | 1/2012 | Gil Coto | B64F 1/305 14/71.5 |
| 9,409,657 | B2 * | 8/2016 | Larson | E01D 15/12 |
| 2011/0309198 | A1 * | 12/2011 | Scharf | B64F 1/3055 244/137.2 |

FOREIGN PATENT DOCUMENTS

| | | |
|---|---|---|
| EP | 2987730 A1 | 2/2016 |
| EP | 3301028 A1 | 4/2018 |
| EP | 3315416 A1 | 5/2018 |
| JP | S61261196 A | 11/1986 |
| WO | 0055038 A1 | 9/2000 |

\* cited by examiner

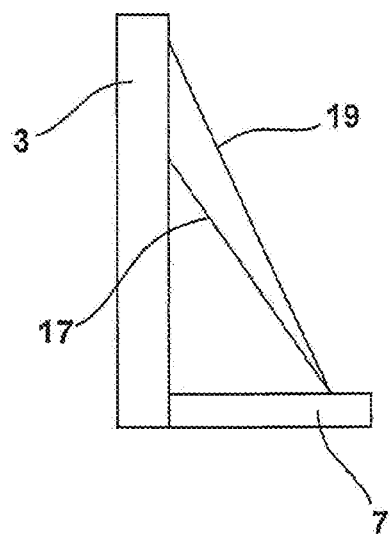
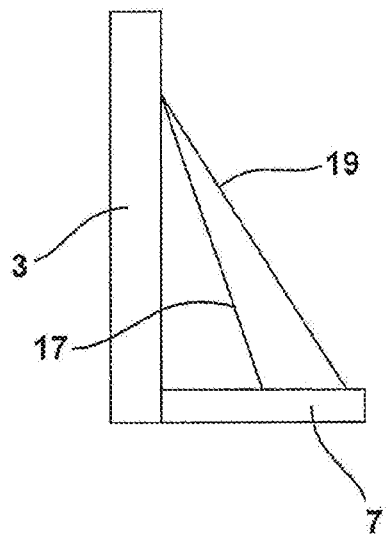
Fig. 2a    Fig. 2b
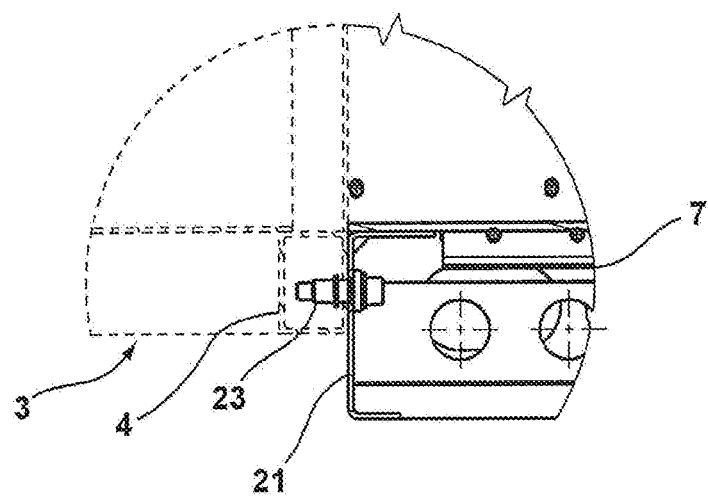
Fig. 3

COUPLING MODULE FOR A PASSENGER BOARDING BRIDGE WITH SUSPENDED FLOOR

CROSS-REFERENCE TO RELATED APPLICATION

This application claims priority from EP Application No. 19170578.9 filed Apr. 23, 2019, the entire content of which is incorporated herein by reference.

FIELD OF THE INVENTION

The present invention relates to a coupling module to form an interface between the cabin of an air passenger bridge and an aircraft, wherein the coupling module has a projecting roof and a floor arrangement spanned by the projecting roof.

BACKGROUND OF THE INVENTION

Air passenger bridges are sufficiently known from the prior art. They serve the passage of persons from the aircraft directly into the airport building. In this connection, an air passenger bridge having a coupling module is known from EP 3 315 416 A1, wherein the coupling module is pivotable about an imaginary horizontal center axis. This is against the background that entry into the airport building is frequently arranged higher than the door opening of the aircraft. The air passenger bridge that is held by a chassis at the front end to this extent extends at a downward slant in the direction toward the door opening of the aircraft. To match the coupling module to the door opening of the aircraft, it can be pivoted about an imaginary horizontal axis at the cabin of the air passenger bridge such that the floor arrangement is disposed in a plane with the aircraft floor.

It is, however, frequently also the case that a pivoting of the coupling module is not necessary because the height difference between the door opening of the aircraft and the building exit is so small that the air passenger bridge extends almost horizontally, which, as already stated, makes a pivotability of the coupling module superfluous.

Floor arrangements are furthermore known that have a so-called sliding floor having individual floor elements, with the floor elements being individually travelable in the direction of the fuselage following the contour of the aircraft in the region of the aircraft doorway to avoid or at least reduce a gap formation between the front side of the floor arrangement and the fuselage. Such a floor arrangement is e.g. known from document EP 3 301 028 A1.

Air passenger bridges having non-pivotable coupling modules have been used a large number of times and have already been in use for decades. Such coupling modules wear over time, which does not only apply to the bellows-like projecting roof, but also to the floor arrangement that is spanned by the projecting roof.

In particular when only the floor arrangement has to be replaced, it is mechanically separated from the cabin, with the new floor in turn being welded to the cabin in accordance with the prior art. The welding of the floor arrangement to the cabin is not unproblematic since heat is introduced into the material forming the cabin by the welding process, which can result in strains and corresponding shape changes at the end face of the cabin.

SUMMARY OF THE INVENTION

A simplified installation of a floor arrangement at the cabin of an air passenger bridge is characterized in accordance with the invention in that the end face of the floor arrangement facing the cabin is fastenable to the cabin by at least one releasable fastening means, in particular by a plurality of releasable fastening means and in that the floor arrangement is connectable to the cabin by at least one anchorage means spaced apart from its end face.

Screws can in particular be considered as releasable fastening means to connect the floor arrangement to the cabin. They have the advantage with respect to a weld connection that the screws can be released as often as required. The dismantling of the floor arrangement can thus be at least substantially simplified in this region. It has proved advantageous in this connection for the floor arrangement to have a support structure that is connected to the cabin by the fastening means for fastening the floor arrangement at its end face facing the cabin.

Provision is made in accordance with the further feature that the floor arrangement can be connected to the cabin spaced apart from its end face by at least one anchorage means. In particular cables or rods serve as anchorage means. The cables and/or rods are typically tensioned. A rod can, however, also be compressed in dependence on the installation state. The anchorage means is here in particular designed such that it likewise permits a releasable fastening of the floor arrangement to the cabin. I.e. the anchorage means can have a fastening means at its end side such as a hook, an eye, a connection section having a locknut, or similar, with the fastening means being received at a corresponding fastening contour at the cabin. The fastening of the anchorage means to the floor arrangement can likewise be a releasable fastening, for which purpose a corresponding fastening means can also be provided at this end region.

Provision can be made with respect to the arrangement of the cables or rods at the cabin, on the one hand, and at the floor arrangement, on the other hand, that at least one anchorage means is arranged at the floor arrangement in each case in the side region of the floor arrangement spaced apart from the end face of the floor arrangement, that is also spaced apart from the end face of the cabin, with the anchorage means being provided at its other end for connection to the cabin. Two anchorage means are preferably provided in each side region that are arranged spaced apart from the end face of the floor arrangement and whose respective other ends can be connected to the cabin.

It becomes clear from this that the end face of the floor arrangement facing the cabin can be arranged at the cabin by releasable fastening means. The floor arrangement as a collar element can to this extent take up vertical forces. However, due to the described anchorage with the aid of the at least one anchorage means, substantially greater forces or torques can be intercepted, in particular when the floor arrangement is subject to an increased load. This can be the case, for example, when a plurality of persons are waiting for access to the aircraft there. It has been found that the floor arrangement in accordance with the invention is able to take up a test load of approximately 375 kg.

Provision is advantageously made to ensure an increased stability of the floor arrangement by the anchorage that the preferably two anchorage means are arranged at the floor arrangement at each side of the floor arrangement, in particular behind one another and spaced apart from one another.

As already stated, the at least one anchorage means is preferably arranged in the side region of the floor region. Provision can in particular be made that the floor region laterally projects over the projecting roof, with the anchorage means being fastened thereto in a side region of the floor region laterally projecting over the projecting roof. This is the requirement for the anchorage means extending—when the coupling module is installed at the cabin—outside the space spanned by the projecting roof, i.e. in a region inaccessible to passengers. The passage width is thus not restricted and there is a smaller risk of accidents, on the one hand. On the other hand, the risk of damage to the fastening of the floor arrangement is minimized.

The at least one anchorage means is advantageously variable in length. This can be done, for example, in that a rod serving as the anchorage means is divided into two, with the two parts being connected to one another by a thread. With cables, so-called cable tensioners are known with the aid of which the cable can be shortened or extended. Alternatively, an anchorage means in the form of a cable can also have a plurality of loops or eyes, whereby the anchorage length can be varied. It is, for example, possible due to the length variability of the one or more anchorage means, to align the floor arrangement horizontally.

It has furthermore proved to be advantageous for the preferably two anchorage means to be configured and in particular for their lengths to be dimensioned such that they can each be connected in an articulated manner in the upper half of the cabin, preferably in the upper third of the cabin. The largest torques can thus in particular be intercepted.

The invention further relates to an air passenger bridge having a cabin and a coupling module configured in accordance with the invention. The statements on the coupling module in accordance with the invention apply accordingly with respect to preferred embodiments of the air passenger bridge.

Provision can in particular be made in the air passenger bridge in accordance with the invention that the cabin has a console to receive the one or more anchorage means at each vertical side. The console here primarily serves the bracing of the cabin in the connection region of the anchorage means.

It can be advantageous for the consoles to laterally project over the cabin. I.e. the anchorage means can be led laterally past the projecting roof, with the floor arrangement also projecting laterally over the projecting roof in a corresponding manner to the console.

The fixing of the console at the cabin of the air passenger bridge can take place by screws.

The invention will be described in more detail below by way of example with reference to the drawings.

BRIEF DESCRIPTION OF THE DRAWINGS

FIG. 2a and FIG. 2b are side views of two different kinds of the arrangement of the anchorage means at the floor arrangement, on the one hand, and at the cabin, on the other hand;
and
FIG. 3 shows the detail X of FIG. 2 in an enlarged representation.

DETAILED DESCRIPTION OF THE INVENTION

Figure 1:
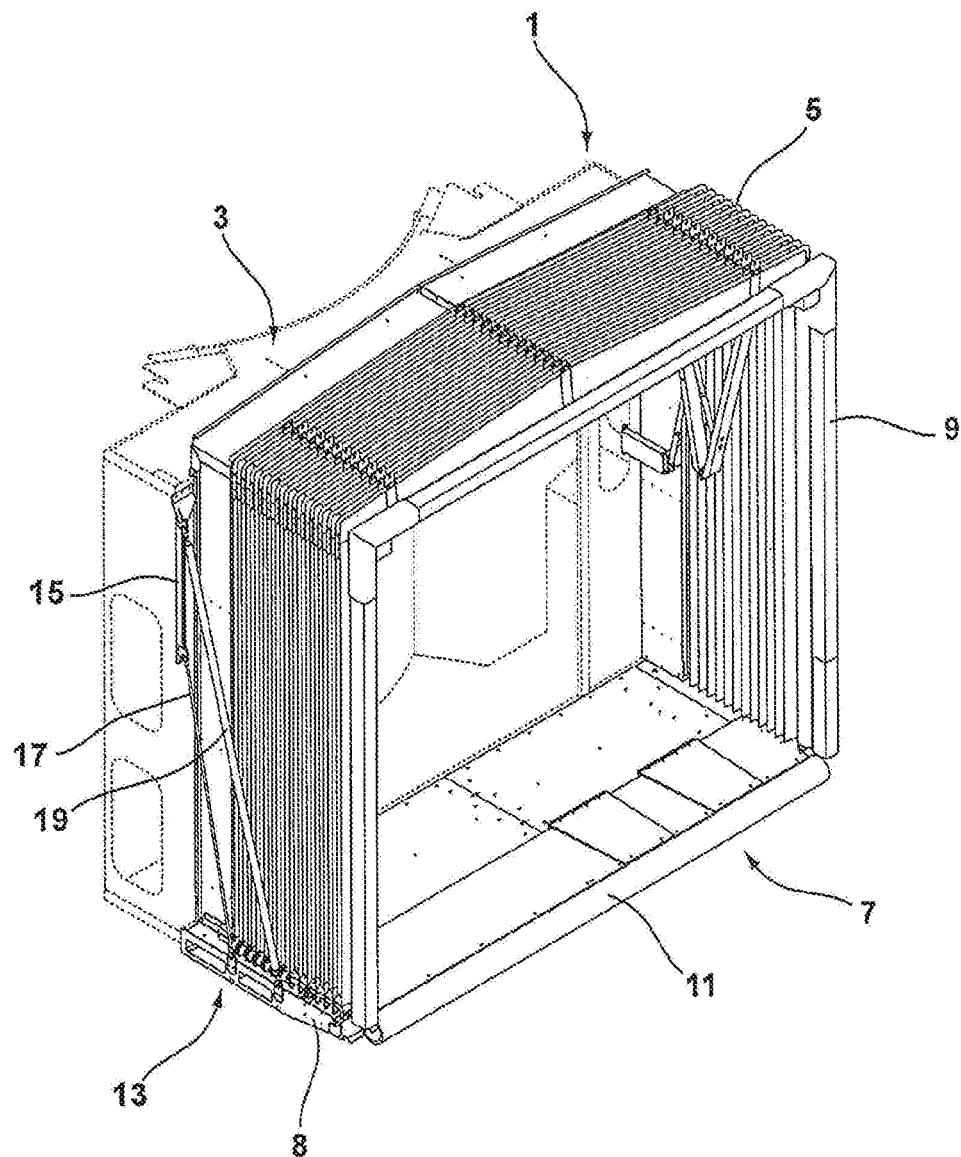
FIG. 1 is a perspective view of a coupling module.

In accordance with FIG. 1, the coupling module 1 has the cabin 3 and the U-shaped folding projecting roof or gangway projecting roof 5. The floor arrangement 7 is spanned by the U-shaped folding projecting roof or gangway projecting roof 5. The U-shaped folding projecting roof or gangway projecting roof has a U-shaped bumper 9 at its side facing the aircraft. The floor arrangement 7 likewise has a bumper 11 that extends over the front edge of the floor arrangement 7. The U-shaped folding projecting roof or gangway projecting roof 5 is connected to the floor arrangement 7. The floor arrangement 7 recognizably laterally (arrow 13) projects beyond the side walls of the projecting roof 5. The cabin 3 of the air passenger bridge also laterally projects over the projecting roof 5 so that the cabin 3 can laterally receive a console 15 at its vertical side to which two anchorage means 17 and 19 are fastened spaced apart from one another. The two anchorage means 17 and 19 are arranged spaced apart from one another and behind one another in the side region 8 of the floor arrangement 7.

Figure 2:
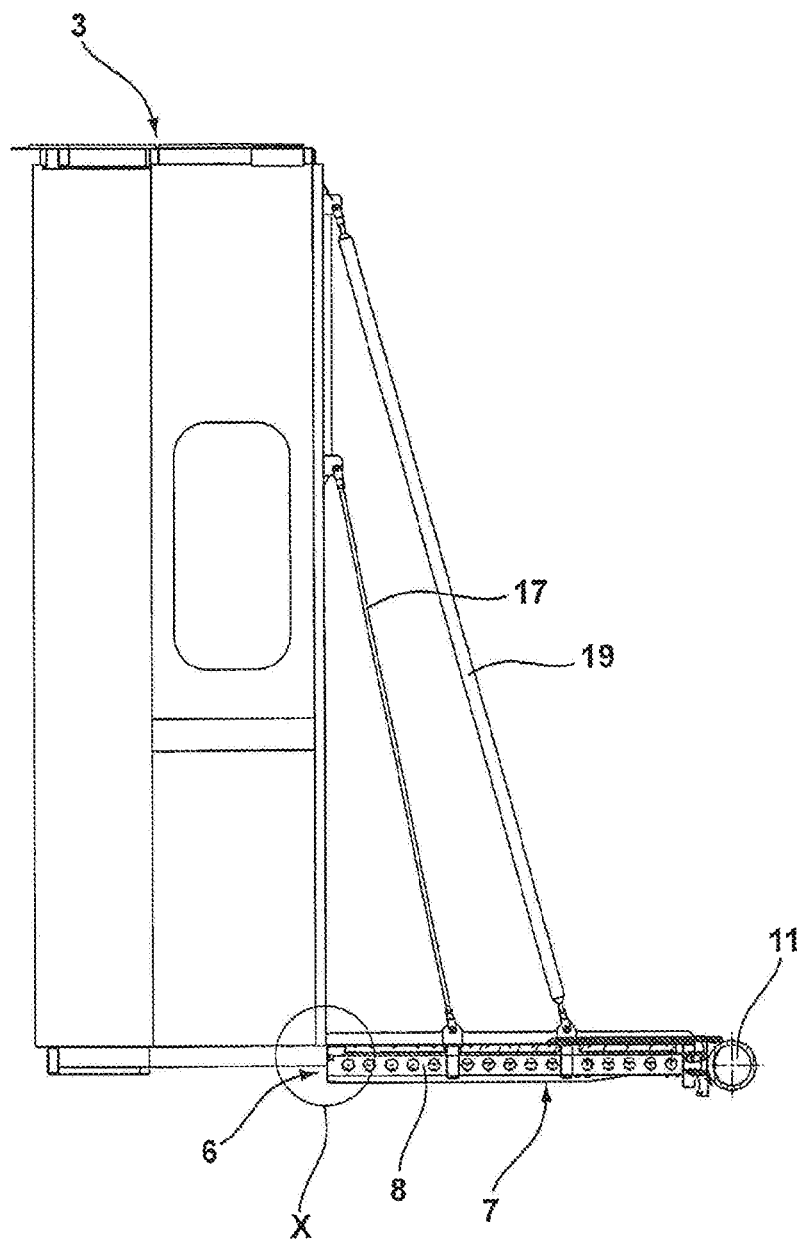
FIG. 2 is a side view of the coupling module, with the projecting roof having been omitted.

As results from the representation in accordance with FIG. 2, the anchorage means 17 and 19 are each supported in an articulated manner both in the region of the console 15 and in the side region 8 of the floor arrangement 7. The anchorage means 17 and 19 can be formed as cables or as rods. There is, however, also the possibility of, for example, forming the one anchorage means 17 as a cable and the other anchorage means 19 as a rod. If the rod is here compressed by shortening the cable, a tensioning of the floor arrangement 7 with respect to the cabin 3 of the air passenger bridge takes place. This means that the rod can be tensioned or compressed depending on the installation state.

FIG. 2a and FIG. 2b each schematically show a different kind of the arrangement of the anchorage means 17, 19 at the floor arrangement 7, on the one hand, and at the cabin 3, on the other hand. In this respect, the anchorage means 17, 19 are respectively arranged at a point at the floor arrangement 7 or at the cabin 3. The articulated connection of the two anchorage means 17, 19 at two points spaced apart from one another takes place at respective oppositely disposed ends.

The support structure 21 of the floor arrangement 7 can be seen from FIG. 3, with the support structure 21 being formed in the manner of a U-shaped bracket. Screws 23 to connect the floor arrangement 7 to the cabin 3 are arranged in the region of the web of the U-shaped bracket of the support structure 21. The cabin 3 has a support 4 for this purpose that extends transversely to the cabin 3.

REFERENCE NUMERAL LIST 1 coupling module
3 cabin
4 support
5 folding projecting roof or gangway projecting roof
6 end face of the floor arrangement
7 floor arrangement
8 side region of the floor arrangement
9 U-shaped bumper
11 bumper
13 arrow
15 console
17 anchorage means
19 anchorage means
21 support structure
23 screws

The invention claimed is:
1. A coupling module for forming an interface between a cabin of an air passenger bridge and an aircraft, comprising:
   a floor arrangement with an end face, configured to face the cabin of the air passenger bridge;
   a projecting roof spanning the floor arrangement;
   at least one fastening element; and
   at least one anchorage element;

wherein the at least one fastening element is configured to releaseably fasten the end face of the floor arrangement to the cabin in a predefined orientation relative to the cabin and restricts the vertical movement of the floor arrangement such that the floor arrangement remains substantially in the predefined orientation, the at least one anchorage element connects the cabin and the floor arrangement, and the at least one anchorage element is supported by the floor arrangement at a point that is spaced away from the cabin and the end face in a direction perpendicular to the end face.

2. The coupling module of claim 1, wherein the at least one fastening element is a screw.

3. The coupling module of claim 1, wherein the at least one anchorage element is a cable or a rod.

4. The coupling module of claim 1, wherein the at least one anchorage element is variable in length.

5. The coupling module of claim 1, wherein the floor arrangement comprises two opposed side regions, the at least one anchorage element comprising at least one anchorage element arranged in each of the side regions and connectable to the cabin.

6. The coupling module of claim 5, wherein the at least one anchorage element arranged in each of the side regions comprises two anchorage elements arranged at each of the side regions such that the two anchorage elements arranged at each of the side regions are spaced apart from each other and one of the two anchorage elements is disposed behind the other one of the two anchorage elements.

7. The coupling module of claim 1, wherein the at least one anchorage element is connectable in an upper half region or an upper third region of the cabin.

8. The coupling module of claim 1, further comprising a support structure at the end face, wherein the support structure is configured for connecting the floor arrangement to the cabin by the at least one anchorage element.

9. The coupling module of claim 1, wherein the floor arrangement projects laterally beyond the projecting roof and wherein the at least one anchorage element is connected to the floor arrangement in a region of the floor arrangement laterally projecting the projecting roof.

10. An air passenger bridge, comprising:
a cabin of the air passenger bridge; and
a coupling module for forming an interface between the cabin of the air passenger bridge and an aircraft, the coupling module comprising:
a floor arrangement with an end face, configured to face the cabin of the air passenger bridge;
a projecting roof spanning the floor arrangement;
at least one fastening element configured to be releasable; and
at least one anchorage element;
wherein the at least one fastening element is configured to releaseably fasten the end face of the floor arrangement to the cabin in a predefined orientation relative to the cabin and restricts the vertical movement of the floor arrangement such that the floor arrangement remains substantially in the predefined orientation, the at least one anchorage element connects the cabin and the floor arrangement, and the at least one anchorage element is supported by the floor arrangement at a point that is spaced away from the cabin and the end face in a direction perpendicular to the end face.

11. The air passenger bridge of claim 10, wherein the cabin comprises a console on each vertical side of the cabin, wherein the console is configured for fastening the at least one anchorage element.

12. The air passenger bridge of claim 11, wherein the console projects laterally beyond the cabin.

13. The air passenger bridge of claim 11, wherein the console is fastened to the cabin by a screw.

* * * * *